United States Patent [19]

Fetterhoff

[11] Patent Number: 5,304,056
[45] Date of Patent: * Apr. 19, 1994

[54] APPARATUS FOR SEALING EDGES OF CORRUGATED PLASTIC MATERIAL

[75] Inventor: Gary W. Fetterhoff, Broken Arrow, Okla.

[73] Assignee: James M. Park, Broken Arrow, Okla.

[*] Notice: The portion of the term of this patent subsequent to Feb. 2, 2010 has been disclaimed.

[21] Appl. No.: 919,353

[22] Filed: Jul. 23, 1992

Related U.S. Application Data

[63] Continuation-in-part of Ser. No. 686,036, Apr. 16, 1991, Pat. No. 5,183,672.

[51] Int. Cl.⁵ ............................................. B29C 59/04
[52] U.S. Cl. ...................................... 425/304; 83/886; 264/284; 264/293; 425/385; 493/60
[58] Field of Search ............... 425/384, 385, 304, 301, 425/306, 307; 264/322, 284, 293, 145; 83/884, 875, 879, 886; 493/60

[56] References Cited

U.S. PATENT DOCUMENTS

| Re. 32,817 | 1/1989 | Vossen | 493/1 |
|---|---|---|---|
| 2,102,170 | 12/1937 | Stern | 493/365 |
| 2,160,221 | 5/1939 | Masters et al. | 206/586 |
| 2,630,519 | 3/1953 | Gard | 83/16 |
| 2,849,752 | 9/1958 | Leary | 425/385 X |
| 2,940,489 | 6/1960 | Feiner | 83/886 X |
| 3,131,425 | 5/1964 | Jacobs et al. | 264/284 X |
| 3,170,974 | 2/1965 | Jacobs | 264/284 |
| 3,292,513 | 12/1966 | Palmer | 83/880 X |
| 3,379,814 | 4/1968 | Bracey, Jr. | 264/322 |
| 3,495,504 | 2/1970 | Sloan | 493/60 |
| 3,907,480 | 9/1975 | Renoux | 425/385 |
| 3,950,480 | 4/1976 | Adams et al. | 264/284 |
| 4,064,206 | 12/1977 | Seufert | 264/295 X |
| 4,307,643 | 12/1981 | Diegel | 83/880 |
| 4,329,829 | 5/1982 | Torterotot | 493/467 |
| 4,363,613 | 12/1982 | Stelck | 425/237 |
| 4,537,102 | 8/1985 | Balzer | 83/16 |
| 4,544,367 | 10/1985 | Vossen | 493/1 |
| 4,594,499 | 6/1986 | Rapsey et al. | 83/16 X |
| 4,642,086 | 2/1987 | Howorth, Jr. | 493/341 |
| 4,740,258 | 4/1988 | Breitscheidel | 264/284 X |
| 4,754,678 | 7/1988 | Nichols et al. | 83/874 |
| 4,822,325 | 4/1989 | Vossen | 493/1 |
| 4,897,030 | 1/1990 | Vajtay | 425/385 X |
| 4,902,366 | 2/1990 | Bader | 425/385 X |
| 4,913,858 | 4/1990 | Miekka et al. | 264/284 X |
| 4,931,031 | 6/1990 | Lisiecki | 493/60 X |
| 4,946,430 | 8/1990 | Kohmann | 264/293 X |
| 4,950,442 | 8/1990 | Tanimoto et al. | 264/293 X |
| 4,951,539 | 8/1990 | Buckner | 83/884 |
| 5,183,672 | 2/1993 | Fetterhoff et al. | 425/304 |

Primary Examiner—Richard L. Chiesa
Attorney, Agent, or Firm—Pravel, Hewitt, Kimball & Krieger

[57] ABSTRACT

An apparatus for making a substantially rigid corrugated plastic material having at least one sealed edge sealed with a seal line pattern. The seal line pattern has a series of generally parallel grooves, wherein preferably groove depth increases from the outside to the middle of the pattern. The apparatus includes a frame, a conveyor system for moving the plastic material along a linear path, a feeder situated at an upstream end of the conveyor system and located to position the plastic material on the conveyor system, a heater situated downstream of the feeding means located to heat the area to be embossed with the seal line pattern to a temperature sufficient to form the seal line pattern, and an embosser having a knurled flat roller and a cooperating embossing roller having a series of ridges suitable for embossing the seal pattern, and a trimmer for trimming any excess material from the seal line.

12 Claims, 9 Drawing Sheets

APPARATUS FOR SEALING EDGES OF CORRUGATED PLASTIC MATERIAL

RELATED APPLICATION DATA

This patent application is a continuation-in-part application of U.S. application Ser. No. 686,036, filed Apr. 16, 1991 and issued as U.S. Pat. No. 5,183,672 on Feb. 2, 1993.

BACKGROUND OF THE INVENTION

1. Field of the Invention

The present invention relates to a method and apparatus for sealing the edges of corrugated plastic material.

2 Description of the Related Art

Figure 11A:
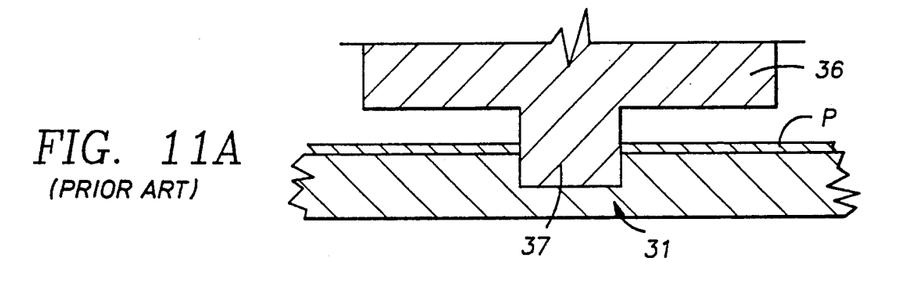
FIGS. 11A and 11B show a prior art scoring wheel, and a scoring wheel of one embodiment of the present invention, respectively.

It has long been known that boxes and containers could be produced from substantially flat sheets of material having fold lines. U.S. Pat. No. 2,102,170, issued Dec. 14, 1937 to Stern, discloses a method and machine for scoring fold lines into paper or cardboard, corrugated or otherwise, to make cardboard or paper boxes. Forming containers from scored plastic sheets is disclosed in U.S. Pat. No. 3,292,513 issued Dec. 20, 1966 to Palmer, and in U.S. Pat. No. 3,495,594. Furthermore, the use of cooperating embossing and flattening rollers is disclosed by Palmer as a means of creating a fold line in plastic sheet materials. More recently, U.S. Pat. No. 4,946,430, issued Aug. 7, 1990 to Kohmann, discloses an apparatus and method for forming at least one shallow fold line (0.15 mm) in thin PVC sheets by first heating the material and then passing the heated material between a pair of rollers. The PVC sheets are heated utilizing heated bars. The fold line is created by the use of a roller which imparts a single substantially "U" shaped groove in the PVC material. See FIG. 11A which shows prior art fold line 31 formed in plastic sheet P utilizing embossing wheel 36 having a single ridge 37.

While the prior art devices are generally adequate for forming thin fold lines plastic materials comprised of plastics with low melting temperatures, the unique problems created by thicker or multilayer higher temperature melting plastic materials render the prior art devices inadequate for forming fold lines in such materials.

For example, the harder plastic materials are generally slippery and tend to slip on the prior art embossing roller systems, which can disrupt system operations and the accurate placement of the fold line. A single groove fold line generally does not provide a structurally sound fold line for thicker or multilayer plastic materials comprised of plastics with higher melting temperatures. In addition the prior art teaches the use of bar heaters which are inadequate for such thicker or multilayer materials. Also, in spite of the prior art teaching that heating only the area to be heat scored will prevent warping, some thicker or multilayer plastics will warp anyway.

Accordingly, there exists a need for an improved heat score machine and method capable of processing harder plastic materials without the slippage experienced by the prior art devices. There also exists a need for an improved machine and method capable of heat scoring thicker or multilayer materials comprised of plastics of higher temperature melting temperatures. In addition, a need exists for an improved fold line pattern that will provide a structurally sound fold line for thicker or multilayer plastic materials.

Corrugated materials, by their very nature, have edges that are "open". Boxes made from such corrugated plastic materials face regulatory hurdles when utilized in applications such as meat handling. Current U.S.D.A. regulations prohibit the use of materials having openings such as those on the side of corrugated materials that will support baterial and viral growth. Thus, there also exists a need for an improved machine and method capable of sealing the edges of plastic corrugated materials.

SUMMARY OF THE INVENTION

According to one embodiment of the present invention there is provided an apparatus for sealing the edges of plastic corrugated material moving along a linear path. Such an apparatus will generally comprise a series of stations all of which are disposed along a conveyor system and mounted on a frame. The conveyor system moves the material along a linear path past the stations. Situated at an upstream end of the conveyor system and adapted to position the material on the conveyor system is the feeding means. The heating means situated downstream of the feeding means is adapted to heat the area to be sealed to a temperature sufficient to form the seal line pattern. Immediately downstream is the embossing means having a knurled flat roller and a cooperating embossing roller comprising a series of ridges suitable for forming the seal line pattern.

According to another embodiment of the present invention there is provided a substantially rigid corrugated plastic material having sealed edges. The edges are sealed with at least one seal line pattern comprising a series of generally parallel grooves. Although the groove size may be the same, preferably, groove depth increases from the outside to the middle of the pattern.

According to yet another embodiment of this invention there is provided a means for embossing at least one seal line pattern on a length of substantially rigid plastic material moving along a linear path comprising a series of generally parallel grooves, wherein preferably the groove depths are increasing from the outside to the middle of the pattern. In this embodiment the embossing means comprises a knurled flat roller and includes a cooperating embossing roller having a series of ridges suitable for embossing the seal line pattern.

According to still yet another embodiment of the present invention there is provided a method for sealing the edges of plastic corrugated material. The method comprises embossing onto a length of substantially rigid plastic material moving along a linear path at least one seal line line pattern comprising a series of generally parallel grooves. Preferably, the groove depth increases from the outside to the middle of the pattern. The method generally comprises conveying the plastic material along a linear path to a heating station where it is heated to a temperature sufficient to allow the seal line pattern to be embossed onto the plastic material. The plastic material is then passed between a knurled flat roller and a cooperating embossing roller comprising a series of ridges suitable for embossing the seal line pattern. Any excess material is then removed from the edges of the corrugated material.

BRIEF DESCRIPTION OF THE DRAWINGS

In order to more fully understand the drawings used in the detailed description of the present invention, a brief description of each drawing is presented.

DETAILED DESCRIPTION OF THE PREFERRED EMBODIMENT

The present invention may generally be used to emboss at least one fold line pattern on almost any type of plastic material. Such materials include corrugated and multilayer plastic materials, for example, multilayer corrugated polyethylene.

Figure 1:
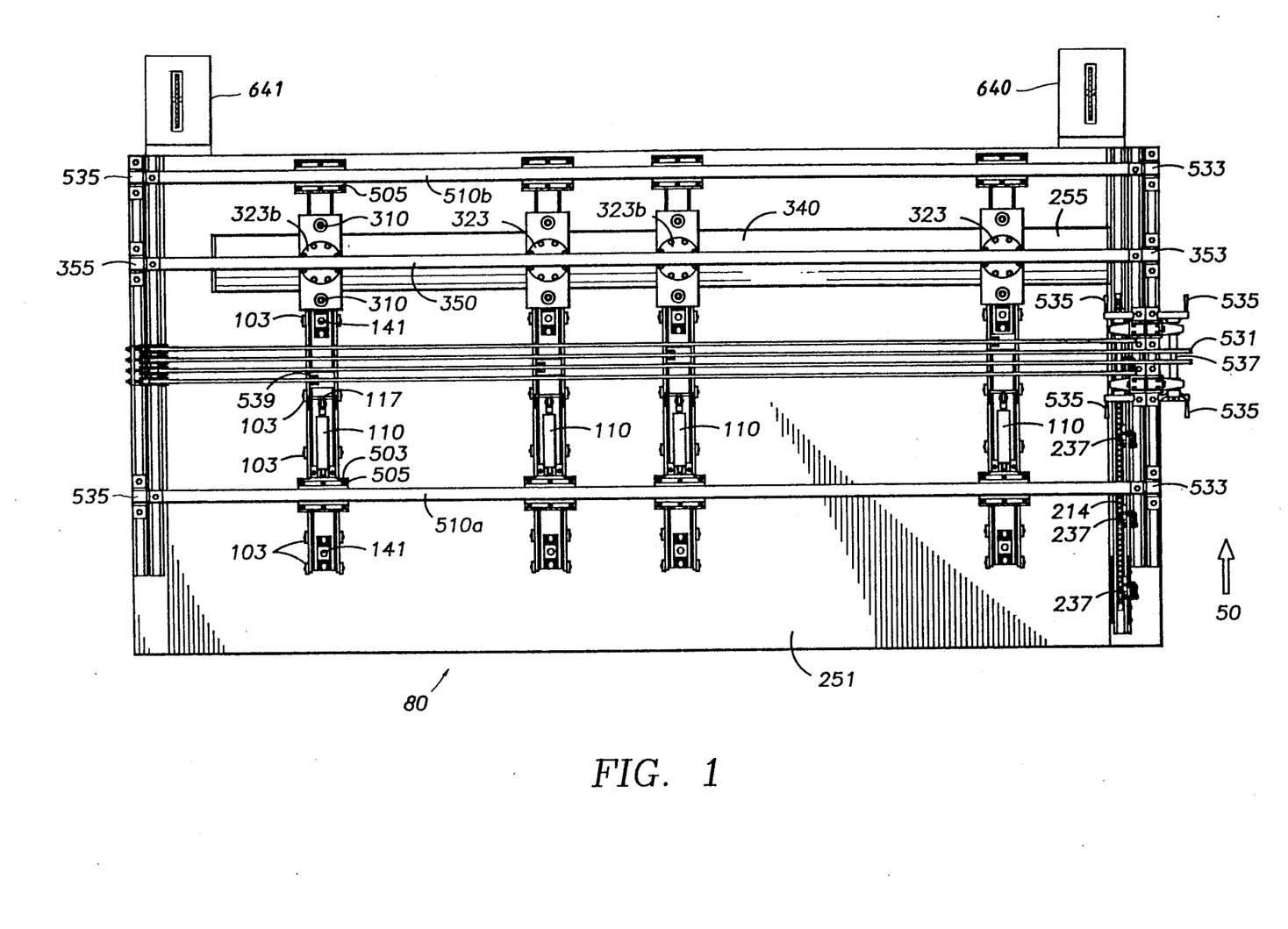
FIG. 1 is a top view of the preferred embodiment.
Figure 2:
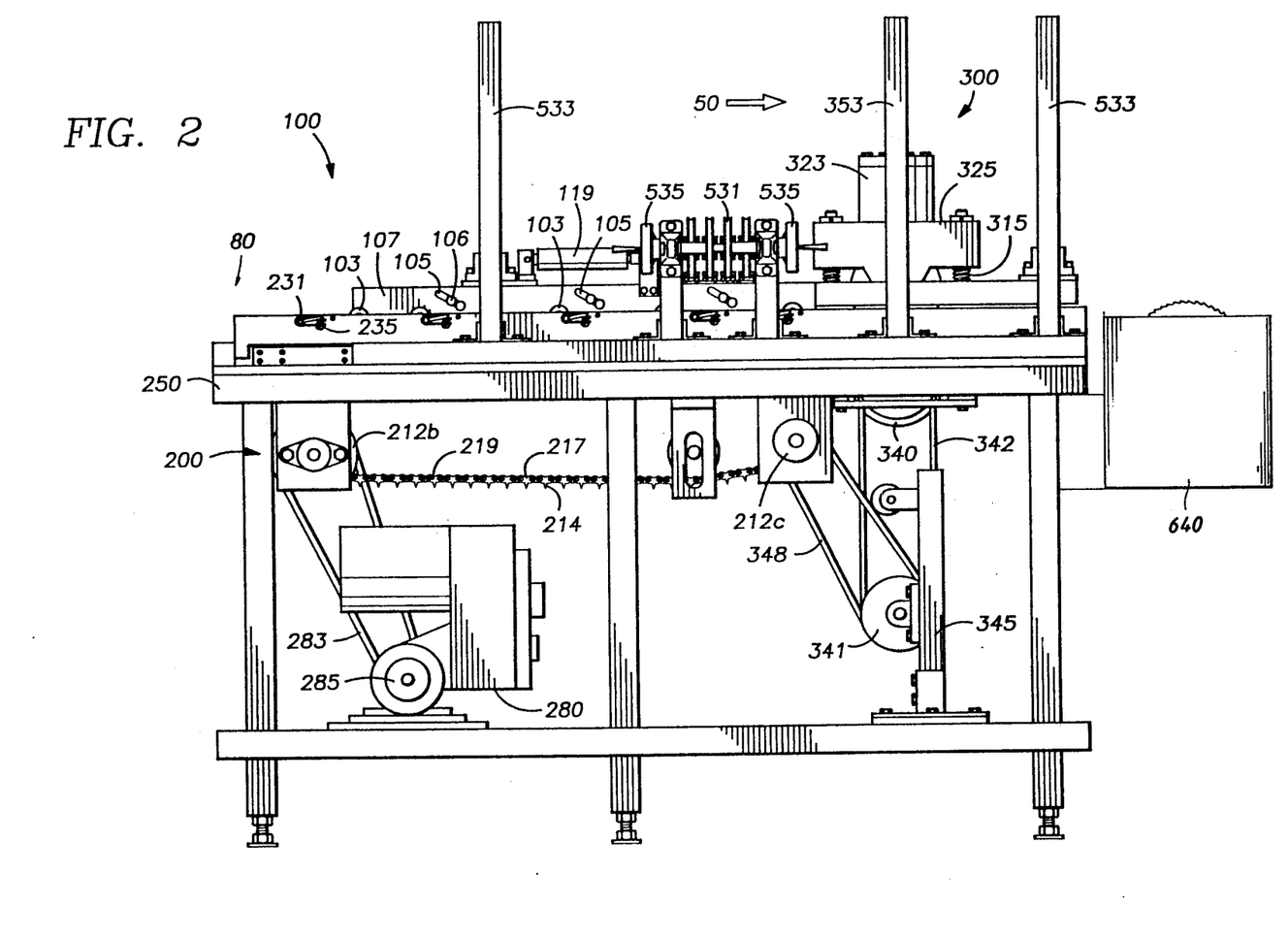
FIG. 2 is a side view of the preferred embodiment.

FIG. 1 shows a top view and FIG. 2 shows an overhead view of heat scoring apparatus A of the present invention for forming at least one fold line pattern in a plastic sheet.

Referring now to both FIGS. 1 and 2 it can be seen that the apparatus generally comprises heating station 100 and heat scoring station 300 both disposed along, above or proximate to conveyor system 200. Conveyor system 200 conveys material, for example a plastic sheet, along a linear path in the direction represented by arrow 50 along a frame 250 from the feeding or staging area 80 located at the upstream end of conveyor system 200 past heating station 100 toward heat scoring station 300. A positioning system comprising positioning control means 530 and a pair of traversing means 510a and 510b orients the heat scoring station 300 over the plastic sheet at the desired location.

Figure 3:
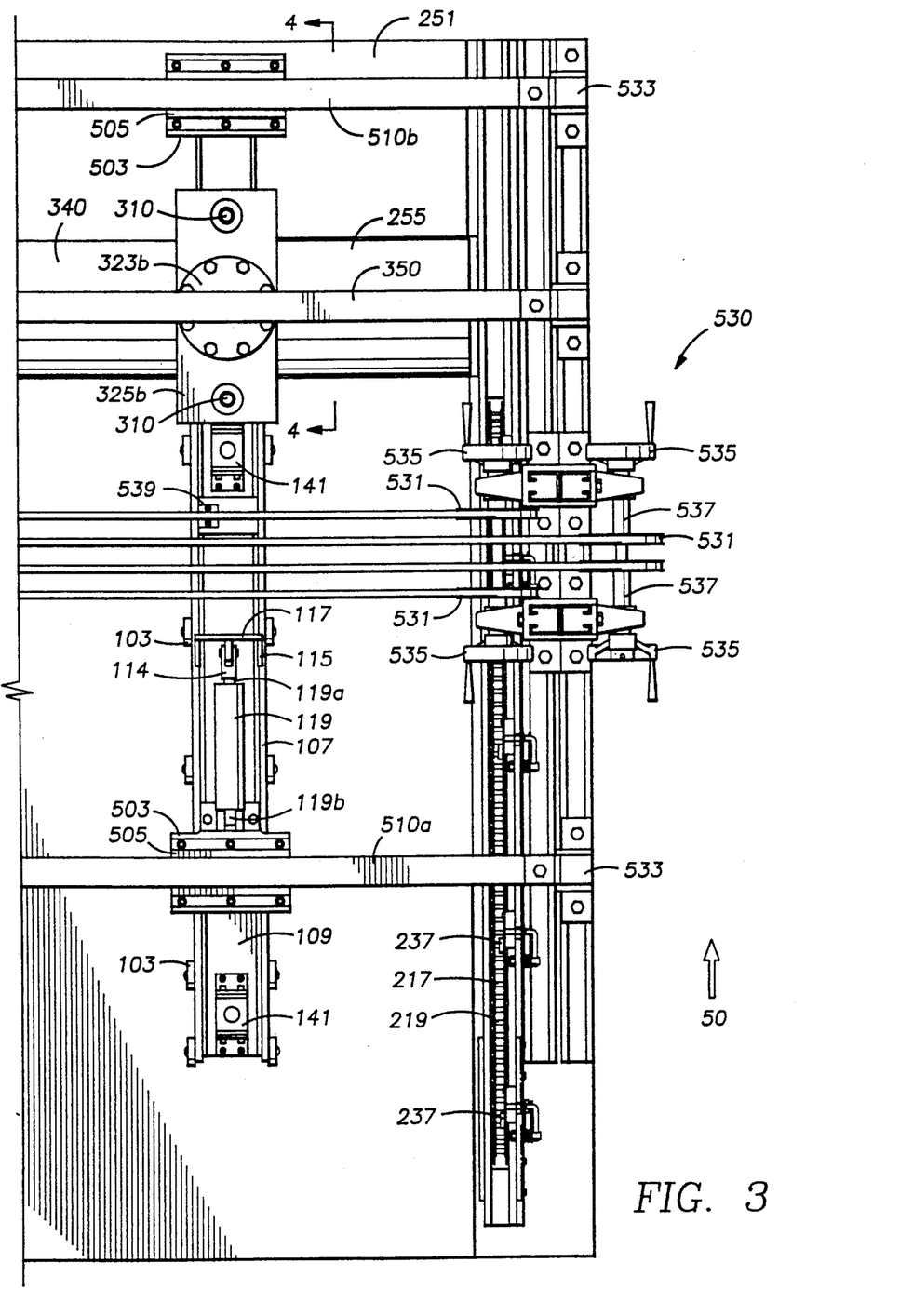
FIG. 3 is a partial top view of the present invention.

Frame 250 supports the heat scoring apparatus of the present invention. Referring to FIGS. 1-3, frame 250 is a table having a working surface 251 along which the plastic sheet is conveyed. At the downstream end of the table is knurled cylinder gap 255 which admits knurled cylinder 340 to allow the plastic sheet to be heat scored between knurled cylinder 340 and scoring wheel 330. Frame 250 is sized to accommodate the plastic sheet and to provide space for all of the apparatus elements. Of course, materials of construction and dimensions may vary, and the following materials of construction and dimensions are given as examples, as the present invention is not intended to be limited to certain materials of construction or certain dimensions. In the embodiment shown, frame 250 is a metal table, with working surface 251 comprising a 2¼" thick plywood top (three stacked pieces of ¾" plywood), and spanning about 60 inches long in travel direction 50 and about 121 inches wide. The plywood top is covered with an ⅛" thick sheet of aluminum which serves to reflect heat energy. Gap 255 is sized to admit knurled cylinder 340 and in the embodiment shown spans about 6⅝" long by 102 inches wide.

The feeding or staging area 80 comprises a feeding means (not shown) that is adapted to position the plastic sheet on conveyor system 200. Any manual or automatic means suitable to position the plastic sheet on conveyor system 200 may be utilized. Preferably, the discharge of a cutting machine, which sizes the plastic material to be heat scored, will discharge the material onto the conveyor system.

Referring still to FIG. 2 and additionally to FIGS. 3 and 7-9, the conveyor system 200 is designed to convey the plastic sheet along the working surface 251 from the feeding or staging area to and also beneath the heating station 100 and then toward the heat scoring station 300. Conveyor system 200 generally comprises an endless loop conveyor belt 217 which is powered by conveyor motor 280 around sprockets 212(a)-(d), referred to collectively as sprockets 212. Endless loop conveyor belt 217 is made of chain links 219 having sharp pointed fingers 214. The fingers 214 engage the plastic sheet to move it along working surface 251.

Figure 7:
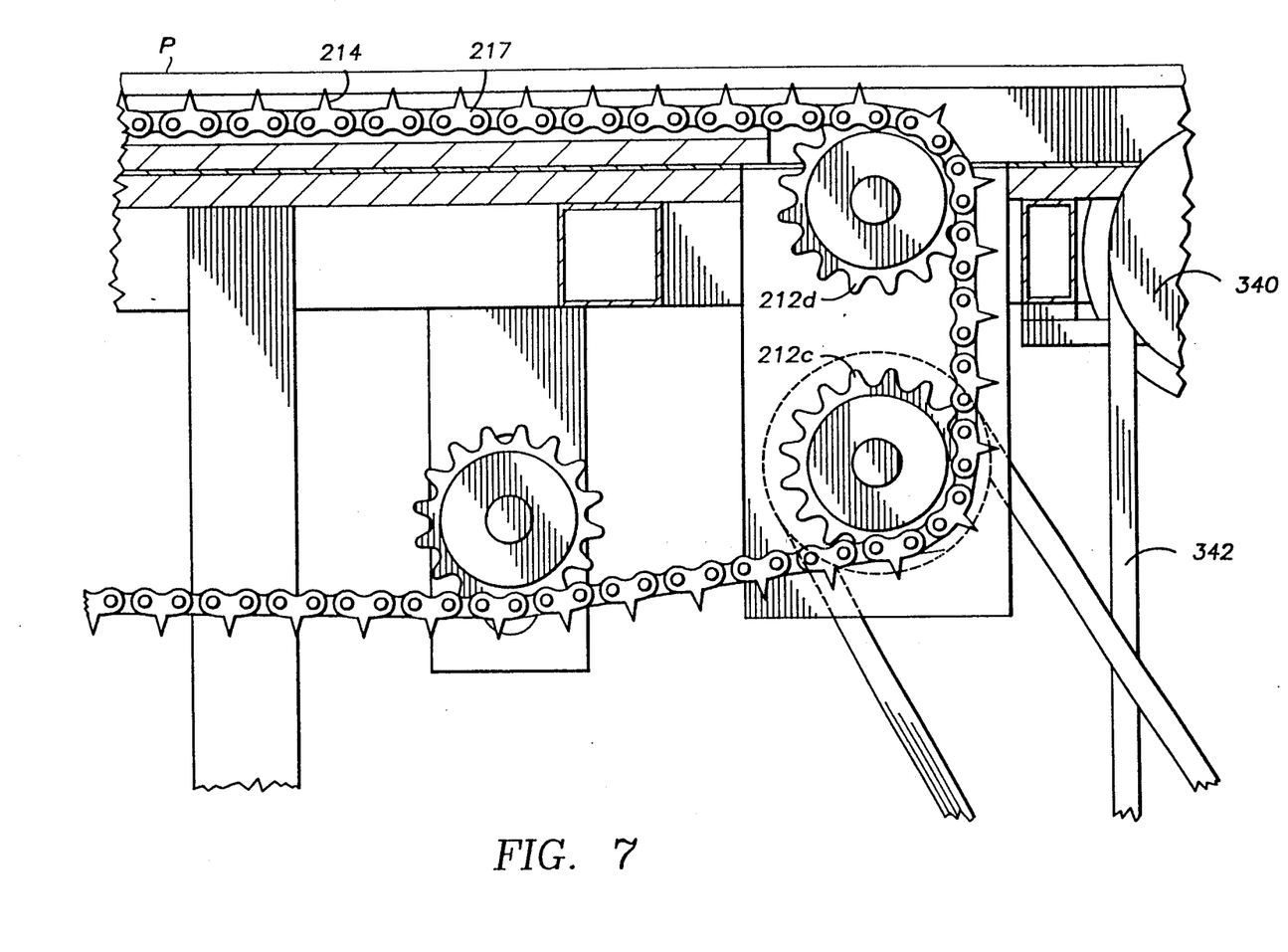
FIG. 7 is a partial side view of the conveyor system and fence of the present invention.
Figures 8, 9:
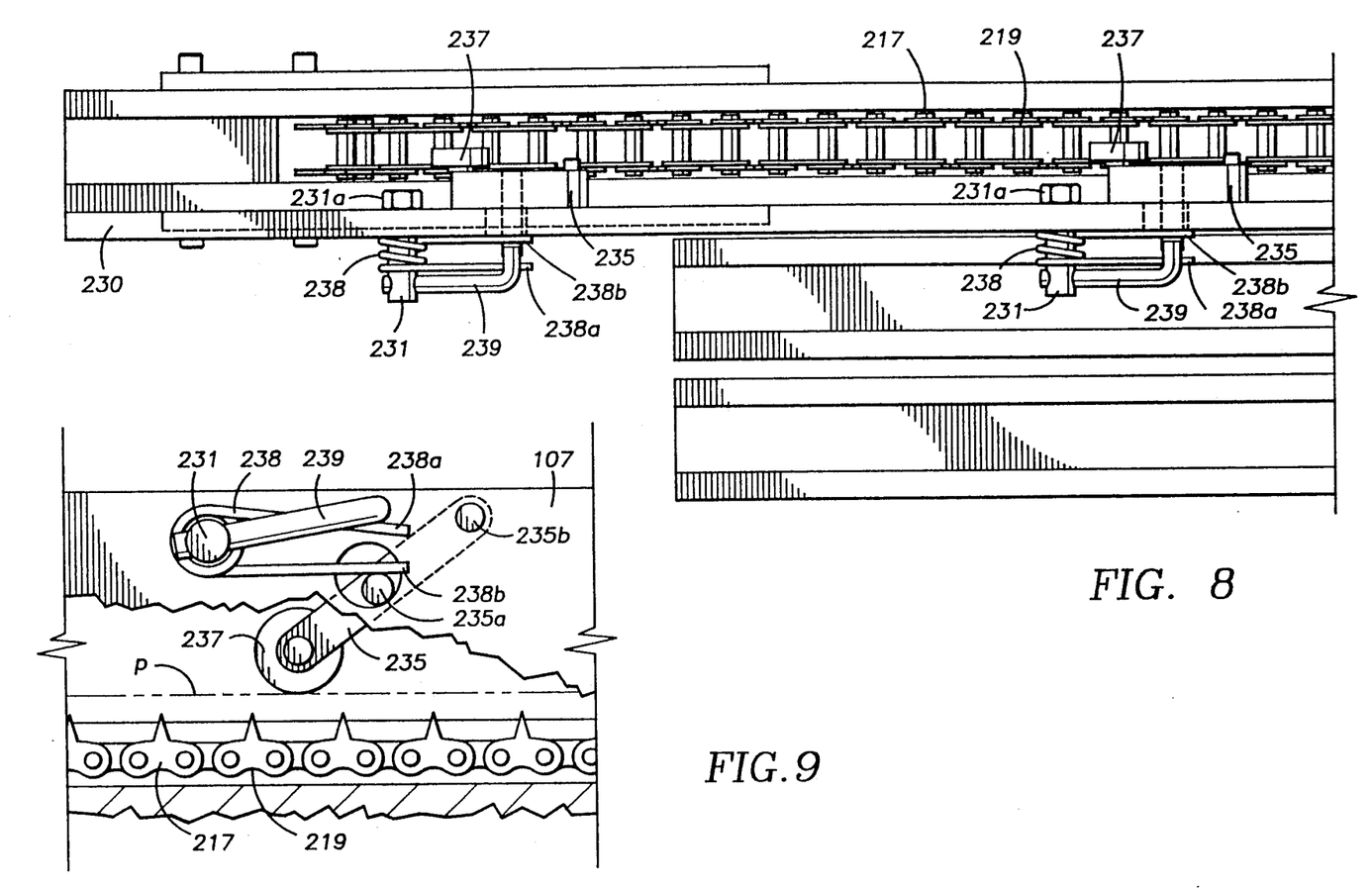
FIG. 8 is a partial top view of the conveyor system of the present invention.
FIG. 9 is a partial side view of a fence roller of the present invention.

Conveyor system 200 is generally disposed along one side of the working surface 251 with fingers 214 extending slightly above the working surface 251. Also positioned along side of conveyor belt 217 is fence 230 which functions as a guide or reference point for the plastic sheet in its travel. Disposed along the length of fence 230 are a multiplicity of spring loaded fence rollers 237. Each fence roller 237 is connected to one end of a fence roller arm 235. The other end of each fence roller arm 235 is connected to a fastener 235b, that connects fence roller arm 235 to fence 230. Each fence roller arm 235 pivots on the fastener 235b to allow roller 237 to be movably engaged with the plastic sheet. Torsion spring 238 is mounted on a torsion spring mount bolt 231 affixed to fence 230 by fastener 231a. End 238a of torsion spring 238 is anchored to the L-shaped fence spring anchor 239, and end 238b of torsion spring 238 is anchored to roller spring anchor 235b. Torsion spring 238 acts to bias fence roller arm 235 downward toward the plastic sheet so that fence roller 237 engages the plastic sheet which in turn forces the plastic sheet into engagement with sharp pointed fingers 214 to help prevent undue slippage of the plastic sheet as it is conveyed along. The force with which fence roller 237 engages plastic sheet P may be adjusted by loosening fastener 231a and rotating L-shaped anchor 239 until the desired force is achieved.

It is generally necessary to engage the plastic sheet with sharp pointed fingers 214 in such a manner as described above because many of the plastic materials utilized as the plastic sheet are hard and slippery.

Referring now to FIG. 2, motor 280 of conveyor system 200 powers endless loop conveyor belt 217 in its path around sprockets 212. Motor drive belt 283 connects motor drive pulley 285 with one of the sprockets 212 to power endless loop conveyor belt 217. Preferably, motor 280 is a variable speed motor or has a variable speed drive to allow for control the length of the heating residence time that the plastic sheet is beneath heating station 100.

Again, the following are presented as nonlimiting examples of the present Invention. In the embodiment shown, endless loop conveyor belt 217 is a #50 roller chain (a smaller chain such as a #30 roller chain could be utilized) with fingers 214 having a length of about ⅝ inches spaced along endless loop conveyor belt 217 at intervals of about ⅝ inches. Fingers 214 are positioned to extend above working surface 251 about 1/16 inch. Motor 280 powers endless loop conveyor belt 217 at rates in the range of about 1.2 inches per second to about 3 inches per second, and is generally a ⅛ h.p. motor.

Figures 5, 6:
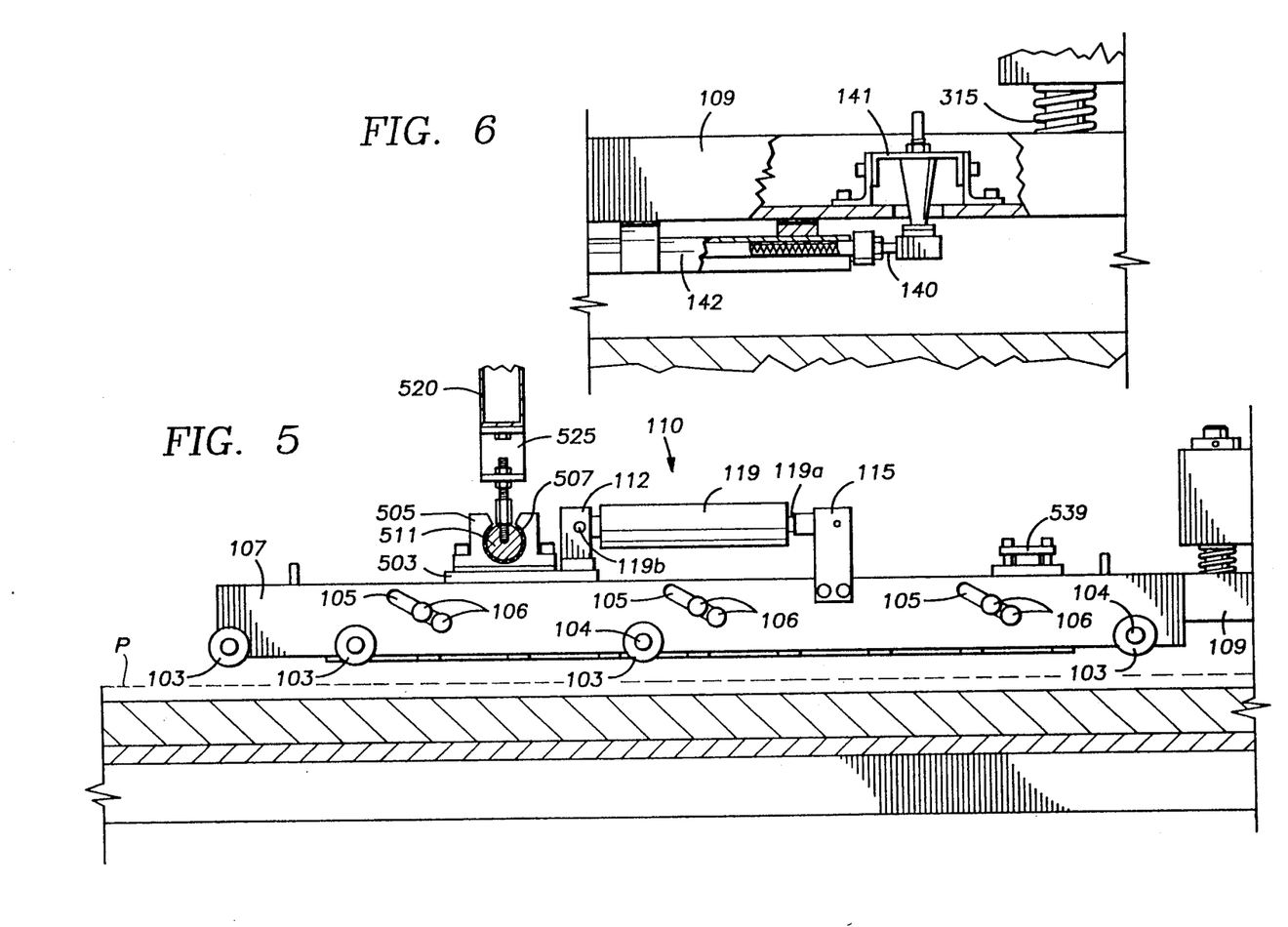
FIG. 5 is a detailed side view of the heating station of the present invention.
FIG. 6 is a detailed partial side view of the heating element of the present invention.
Figure 10:
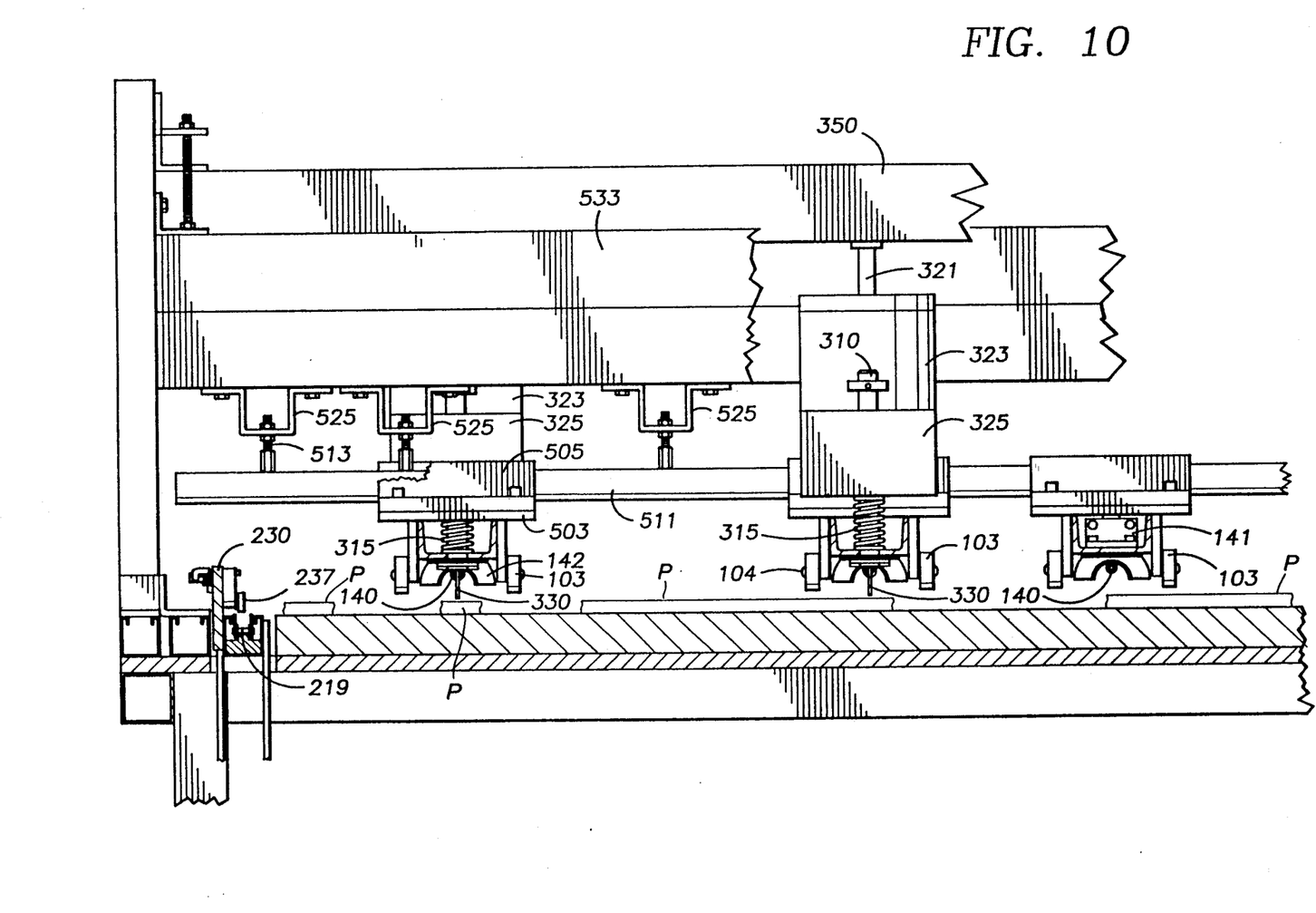
FIG. 10 is a front view showing the heating stations.

Referring again to FIGS. 1-3 and additionally to FIGS. 5, 6, and 10, heating station 100 is located downstream from the feed or staging area. The purpose of heating station 100 is to heat the plastic sheet to a temperature sufficient to score or emboss it at heat scoring station 300.

Heating station 100 is generally wide enough to heat the immediate width around the area to be scored and is generally oriented longitudinally in direction 50.

Heating station 100 comprises a housing 109 to which is suspended by fasteners 141. Situated within the housing is heating element 140 that extends longitudinally for most of the length of heater housing 109. Heating element 140 is generally any heating element capable of imparting sufficient heat to the surface of the plastic sheet to scored it. Preferably, heating element 140 is an infra red heating element, and more preferably, a quartz infra red heating element.

To help concentrate the heat onto a desired area of the plastic sheet, a reflector 142 is suspended above heating element 140. Preferably reflector 142 is an elongated parabolically shaped reflector and 142 is attached to heater housing 109 by bolts 144. When plastic sheet P is a multilayer or corrugated material, it is more difficult to heat the material through all of the layers sufficiently for a heat score to be formed to the proper depth without overheating the top surface of plastic sheet P. In addition to being reflected by reflector 142, infra red energy rebounds from the reflective wording surface 251 which helps to provide sufficient heating while not overheating the top surface of plastic sheet P.

Heating of plastic sheet P along a narrow path will cause the plastic sheet P to warp and/or to buckle upwardly toward the heating station 100. Such deformation may cause misalignment of the plastic sheet P and move it too close to the heating element 140. To prevent this, a series of hold down rollers 103 are provided that hold the plastic sheet P flat as it travels beneath heating element 140. Each roller 103 is attached to a hold down bar 107 by an axle 104 upon which each roller 103 rotates. A hold down bar 107 runs longitudinally on each side of housing 109 and is affixed to the housing by studs 106 in slots 105. Studs 106 are generally aligned to allow the bar 107 to angle forward and downward as it is moved.

The rollers 103 are moved into engagement with plastic sheet P by a hold down roller engagement system shown generally at 110. In the embodiment shown, the hold down roller engagement system 110 comprises a pneumatic cylinder 119 mounted atop housing 109. Back end 119b of pneumatic cylinder 119 is affixed to housing 109 by bracket 112. Cylinder rod 119a is connected to yolk 117 by bracket 114. Yolk 117 is in turn connected to hold down bars 107 on each side of housing 109 by brackets 115.

As air is supplied to pneumatic cylinder 119, cylinder rod 119a extends outwardly away from cylinder 119. Yolk 117 is then moved forward with the orientation of studs 106 and slots 105 allowing hold down bar 107 to move at an angle forward and downward from its top position, shown by hold down bar 107a and hold down roller 103a, to a down position with hold down rollers 103 engaging plastic sheet P.

In general the hold down rollers 103 should be disposed along hold down bar 107 at intervals sufficient to prevent warping. In the embodiment shown, hold down rollers 103 are disposed along hold down bar 107 at intervals of about 10 inches.

The plastic material must be heated sufficiently to allow for the fold line pattern to be embossed onto the plastic material this requires that the plastic material be heated up at least to its softening point. The heating temperatures will vary with the type of plastic material used, but for multilayer polyethylene corrugated type materials, the materials must be heated at least to a temperature in the range of about 175° F. to about 400° F.

Referring now to FIGS. 1-4 it can be appreciated that located immediately downstream of heating station 100 is heat scoring station 300. Upon departure from heating station 100, plastic sheet P is conveyed by conveyor system 200 to heat scoring station 300 where it passes between scoring wheel 330 and knurled cylinder 340, which impart to plastic sheet P a longitudinal fold line pattern running in direction 50.

Figure 4:
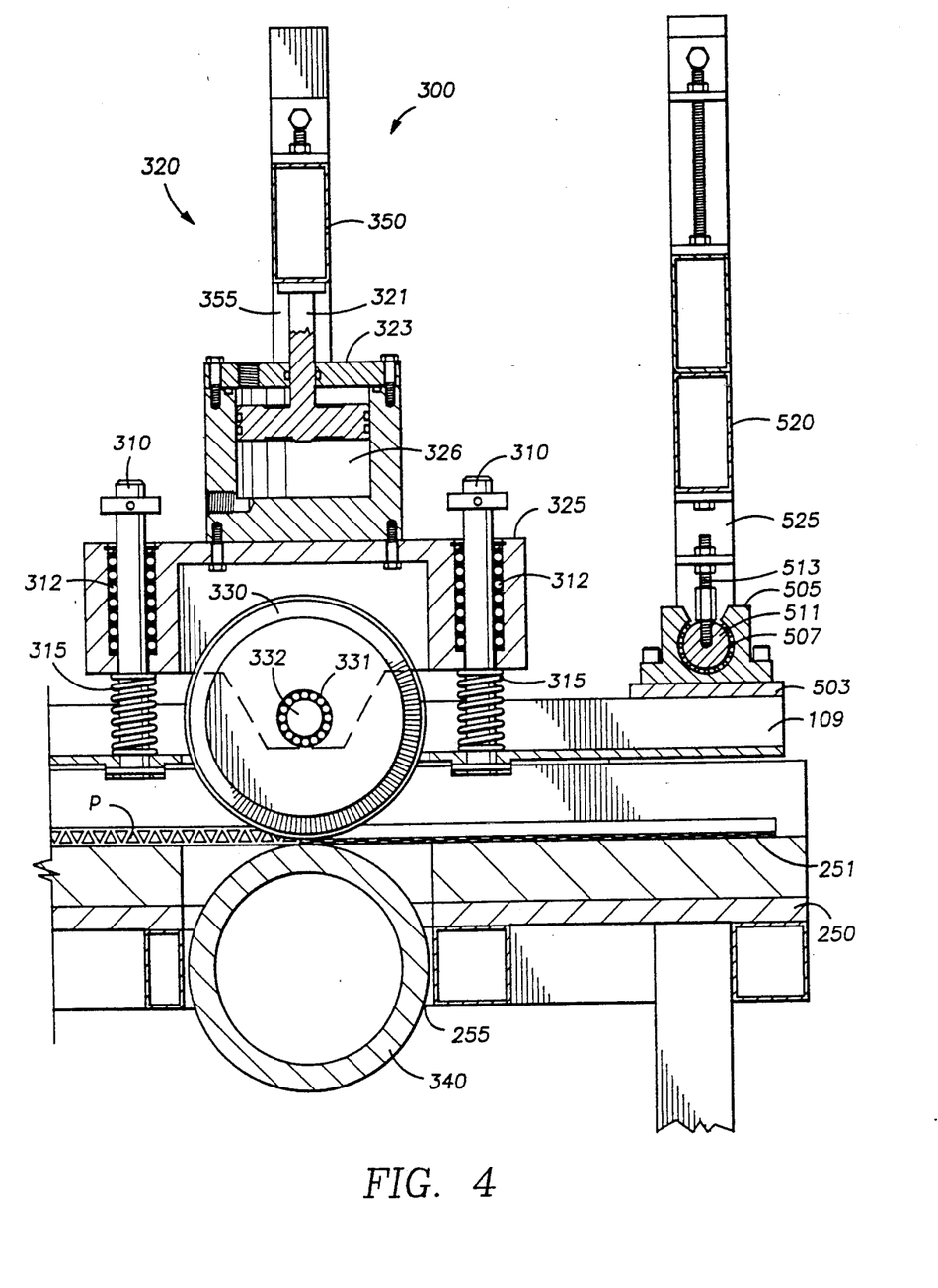
FIG. 4 is detailed side view of the embossing station of the present invention along line 4—4 of FIG. 3.

Heat scoring station 300 generally comprises a vertically movable upper section wheel cage assembly, shown generally at 320 which houses scoring wheel 330, and a lower section having knurled cylinder 340.

The knurled cylinder 340 has a rough or knurled surface to allow the plastic sheet P to be gripped and to prevent undue slippage as the plastic sheet P passes between knurled cylinder 340 and scoring wheel 330. Knurled cylinder 340 generally extends laterally across most of the width of working surface 251 at knurled cylinder gap 255. Again, while the present invention is not intended to be limited to any particular dimensions, knurled cylinder 340 of the embodiment illustrated in the figures, has an outer diameter of about 6⅝ inches and extends laterally across the working surface 251 for about 102 inches.

Knurled cylinder 340 is driven by endless belt 342 coming from jack shaft assembly 345. Jack shaft assembly 345 is in turn powered by sprocket 341 keyed to one of the sprockets 212 of conveyor system 200 with endless belt 348. Scoring wheel 330 is not directly driven, but instead idles.

Scoring wheel 330 is carried on a static wheel axle 332. A multiplicity of ball bearings 331 allow scoring wheel 330 to rotate freely on axle 332. Axle 332 is supported by wheel cage housing 325 which in turn is affixed to housing 109 by a pair of vertical rods 310. Rods 310 are each surrounded by a multiplicity of linear ball bushings 312 which permit wheel case housing 325 to move in a vertical direction. Wheel springs 315 are coiled around rods 310 and are positioned between working surface 251 and wheel cage housing 325 to help keep scoring wheel 330 suspended above working surface 251 when the scoring wheel 330 is not needed.

Affixed to the top of housing 325 is a pneumatic cylinder 323. Suspended rigidly overhead is scoring bridge 350 which extends laterally across working surface 251 above heat scoring station 300. Scoring bridge 350 is suspended overhead by supports 353 and 355, which connect scoring bridge 350 to frame 250.

The gap between scoring wheel 330 and knurled cylinder 340 may be adjusted for different thicknesses of plastic sheet P. This allows for flexibility in utilizing different feed thickness.

To engage scoring wheel 330 with plastic sheet P, air is forced through part 326 into the lower chamber of pneumatic cylinder 323 so as to cause a piston 321 to move upwardly until piston 321 contacts scoring wheel bridge 350. As bridge 350 is fixed, continual air pressure causes wheel cage assembly 325 to depress springs 315, allowing scoring wheel 330 to engage plastic sheet P. Scoring depth can be adjusted by controlling the air pressure to pneumatic cylinder 323. Once the air pressure is released, springs 315 force the wheel cage 325 back up and away from working surface 251. Alternatively, the length of piston 321 may be adjusted so that at full extension of piston 321 scoring wheel 330 is at the proper desired vertical position.

The fold line pattern comprises a series of generally parallel fold lines. The fold lines within a fold line pattern may all have the same size and shape. Preferably, however, to bias the material into folding at or near the middle of the fold line pattern, the depth of the fold lines increases from the outside to the middle of the pattern, with the middle fold line (or middle two fold lines if there is an even number of fold lines) being the deepest. Likewise, it is also preferable that the width of the fold lines increases from the outside to the middle of the pattern. The scoring wheel 330 will have ridges suitable for making the desired fold line pattern.

Figure 11B:
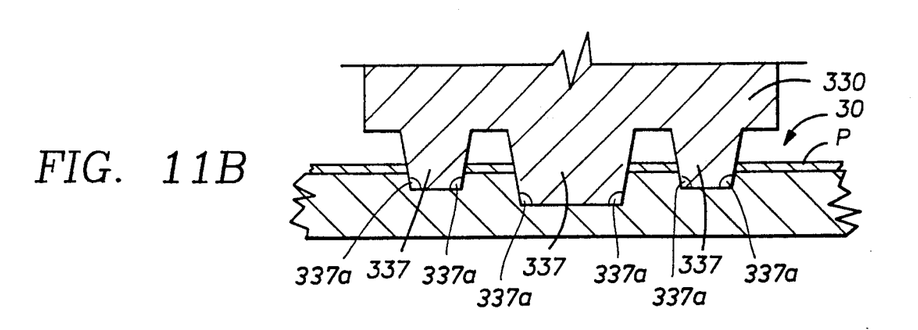

FIG. 11B shows fold line pattern 30 of the preferred embodiment of the present invention. Also shown is scoring or embossing wheel 330 with embossing ridges 337 that form fold line pattern 30. Angle 337a is generally in the range of about 90 to about 160 degrees. Preferably, angle 337a is in the range of about 100 to 125 degrees. The fold line pattern comprises at least about 3 fold lines.

In practice, angle 337a, and the width and the depth of the grooves are all a function of the material utilized and its thickness. These variables must be selected to give an adequate fold line pattern for the given material.

For example, for 5/32 inch multilayer corrugated high density polyethylene materials, the depth of the outer fold lines is generally in the range of about 2.6 mm to about 2.8 mm and the depth of the inner or deeper fold lines is in the range of about 3.4 mm to about 3.6 mm. The width of the bottom of the outer fold lines is generally in the range of about 1.7 mm to about 2.0 mm, and depending on angle 337a, the width of the top of the outer fold lines is generally in the range of about 1.7 mm to about 3.3 mm. The width of the bottom of the inner fold lines is generally in the range of about 2.8 mm to about 3.2 mm, and depending on angle 337a, the width of the top of the outer fold lines is generally in the range of about 3 mm to about 5 mm. Of course, the particular dimensions for the fold lines will vary depending on the application, the material utilized, and its thickness, and the above dimensions are presented merely as nonlimiting examples.

In order to provide for scoring at various positions across plastic sheet P, a positioning system is provided to position scoring wheel 330 at various points laterally across knurled cylinder wheel 340. Referring to FIGS. 1-4, the positioning system comprises a positioning control means, shown generally at 530 and a pair of traversing means 510a located at the downstream end of housing 109, and 510b located at the upstream end of housing 109.

Both traversing means 510a and 510b can be described as follows. Baseplate 503 connects open ball bushing 505 to housing 109. Ball bearings 507 allow ball bushing 505 to slide along traversing rod 511, which is suspended above and across working surface 251. Traversing rod 511 is suspended above and across working surface 251 by vertical rods 533 and 535, which are in turn connected to frame 250. Positioning control means 530 comprises handle 535, rod 537 and tape 531 with positioning read out. Tape 531 is connected to housing 109 by bracket 539. As handle 535 is turned, the position of scoring wheel 330 is changed and may be determined by reading tape 531. The scoring wheel 330 may be locked in place.

In the heat scoring apparatus of the present invention, a multiplicity of heat score fold lines may be created simultaneously by providing multiple sets of heating/scoring stations arranged generally parallel to each other. In the embodiment as shown in the figures, there are 4 parallel heating systems 100 each with its own heat scoring wheel 330, and traversing system. They all share a common knurled cylinder 340.

The present invention permits the creation of one or more fold line patterns on a plastic sheet P. After the fold line patterns are created, plastic sheet P may be manually or automatically folded along the fold lines to form the container or box shape desired.

In addition, the present invention may be utilized to form plastic corrugated materials having sealed edges. A fold line pattern (or seal line) is created along or near the open edge where it is desired to have a sealed edge. After the seal line is created, any excess materials can be trimmed or removed leaving a sealed edge. Such trimming can be easily accomplished with a cutting station. In the embodiment shown, cutting stations 640 and 641 are each circular saws that are easily positioned to trim excess materials from the sealed edge. The gap between scoring wheel 330 and knurled cylinder 340 will have to be adjusted to provide for proper sealing of the corrugated material.

The description given herein is intended to illustrate the preferred embodiments of the present invention. It is possible for one of ordinary skill in the art to make various changes to the details of the present invention, including changes in the size, shape and materials, as well as in the details of the illustrated construction without departing from the spirit of this invention. Therefore, it is intended that all such variations be included within the scope of the present invention as claimed.

What is claimed is:

1. An apparatus for embossing onto a length of material moving along a linear path at least one seal line pattern, located at or substantially near the edge of the material, and comprising a series of generally parallel grooves, the apparatus comprising:
   a frame;
   a means for moving said material along a linear path;
   a means for feeding said material, said feeding means being situated at an upstream end of the conveyor system and located to position the said material on the moving means;
   a means for heating said material, said heating means being situated downstream of the feeding means and located to heat the area to be embossed with the seal line pattern to a temperature sufficient to form the seal line pattern; and
   a means for embossing said plastic material, said embossing means comprising a knurled flat roller and a cooperating embossing roller comprising a series of ridges suitable for embossing the seal line pattern; and a means for trimming excess material away from the seal line.

2. The apparatus of claim 1 wherein the groove depth increases from the outside to the middle of the pattern.

3. The apparatus of claim 2 wherein said moving means comprises an endless loop belt disposed along the frame and located to travel in the longitudinal direction and further comprises a fence to guide said material as it travels along the linear path.

4. The apparatus of claim 2 wherein said heating means comprises a heat reflector for directing heat to the desired location and hold down rollers for keeping said material from warping as it is heated.

5. The apparatus of claim 4 wherein the heat reflector is an elongated parabolic reflector.

6. The apparatus of claim 2 wherein the heating means further comprises means for holding down said material.

7. The apparatus of claim 2 wherein said heating means comprises an infra red quartz heating element.

8. The apparatus of claim 2 wherein the series of ridges comprises at least three ridges suitable for making the grooves.

9. The apparatus of claim 2 wherein the frame comprises a table.

10. The apparatus of claim 2 wherein said material comprises a multilayer high density polyethylene corrugated material.

11. The apparatus of claim 10 wherein the heating means is suitable to heat said material to a temperature in the range of about 175° F. to about 400° F.

12. The apparatus of claim 2 wherein said moving means comprises an endless loop belt disposed along the frame and located to travel in the longitudinal direction, and a fence to guide said material as it travels along the linear path;

said heating means comprises an infra red quartz heating element and an elongated parabolic reflector for directing heat to the desired location, and hold down rollers for keeping said material from warping as it is heated;

said seal line pattern comprises at least three grooves and the embossing means comprises ridges suitable for making the grooves; and said frame comprises a table.

* * * * *